United States Patent
Choi et al.

(10) Patent No.: US 10,980,012 B2
(45) Date of Patent: Apr. 13, 2021

(54) METHOD AND APPARATUS FOR CONTROLLING PATH OF BASE STATION IN WIRELESS COMMUNICATION SYSTEM

(71) Applicant: Samsung Electronics Co., Ltd., Suwon-si (KR)

(72) Inventors: Yonghae Choi, Seongnam-si (KR); Kiho Cho, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 28 days.

(21) Appl. No.: 16/099,565

(22) PCT Filed: May 22, 2017

(86) PCT No.: PCT/KR2017/005279
§ 371 (c)(1),
(2) Date: Nov. 7, 2018

(87) PCT Pub. No.: WO2017/200359
PCT Pub. Date: Nov. 23, 2017

(65) Prior Publication Data
US 2019/0200325 A1 Jun. 27, 2019

(30) Foreign Application Priority Data
May 20, 2016 (KR) .................. 10-2016-0061984

(51) Int. Cl.
*H04W 74/04* (2009.01)
*H04W 72/04* (2009.01)
(Continued)

(52) U.S. Cl.
CPC ......... *H04W 72/042* (2013.01); *H04L 5/0023* (2013.01); *H04L 5/0035* (2013.01); *H04L 5/0044* (2013.01); *H04L 5/0087* (2013.01); *H04L 5/0096* (2013.01); *H04L 27/26* (2013.01); *H04L 27/2656* (2013.01);
(Continued)

(58) Field of Classification Search
CPC .................................................. H04W 72/042
See application file for complete search history.

(56) References Cited

U.S. PATENT DOCUMENTS 9,622,233 B1 * 4/2017 Mansour ............... H04W 52/04
2011/0195741 A1 8/2011 Kim et al.
(Continued)

FOREIGN PATENT DOCUMENTS

KR 10-2010-0081693 A 7/2010
KR 10-2011-0093054 A 8/2011
(Continued)

*Primary Examiner* — Jason E Mattis
(74) *Attorney, Agent, or Firm* — Jefferson IP Law, LLP

(57) ABSTRACT

A signal transmission method for a transmission apparatus having at least two transmission paths and an apparatus for performing the same are provided. The method includes identifying a starting point of a frame, identifying, on the basis of the starting point of the frame, whether a physical downlink shared channel (PDSCH) has been allocated, determining an on/off-state of each transmission path on the basis of whether the PDSCH has been allocated, and transmitting a signal by using a transmission path in an on-state.

13 Claims, 5 Drawing Sheets

(51) Int. Cl.
  *H04W 72/12* (2009.01)
  *H04W 88/08* (2009.01)
  *H04W 52/02* (2009.01)
  *H04L 5/00* (2006.01)
  *H04L 27/26* (2006.01)
  *H04L 27/36* (2006.01)
  *H04B 7/0413* (2017.01)

(52) U.S. Cl.
  CPC ........... *H04L 27/364* (2013.01); *H04W 52/02* (2013.01); *H04W 52/0206* (2013.01); *H04W 72/04* (2013.01); *H04W 72/0446* (2013.01); *H04W 72/12* (2013.01); *H04W 72/1289* (2013.01); *H04W 88/08* (2013.01); *H04B 7/0413* (2013.01); *H04L 5/0048* (2013.01); *Y02D 30/70* (2020.08)

(56) References Cited

U.S. PATENT DOCUMENTS

| | | |
|---|---|---|
| 2012/0149411 A1 | 6/2012 | Miyoshi et al. |
| 2013/0235962 A1 | 9/2013 | O'Keefe et al. |
| 2015/0245323 A1 | 8/2015 | You et al. |
| 2015/0365889 A1* | 12/2015 | Rajendran ......... H04W 52/0206 455/453 |
| 2015/0365890 A1* | 12/2015 | Rajendran ......... H04W 52/0206 370/311 |
| 2016/0198405 A1 | 7/2016 | Choi et al. |
| 2017/0048041 A1* | 2/2017 | Yi .................... H04W 8/005 |

FOREIGN PATENT DOCUMENTS

| | | |
|---|---|---|
| KR | 10-2015-0105289 A | 9/2015 |
| KR | 10-2016-0085022 A | 7/2016 |
| WO | 2012/065990 A1 | 5/2012 |

* cited by examiner

METHOD AND APPARATUS FOR CONTROLLING PATH OF BASE STATION IN WIRELESS COMMUNICATION SYSTEM

TECHNICAL FIELD

The present disclosure relates to a method and apparatus for controlling the path of a base station in a wireless communication system. More specifically, the present disclosure relates to a method and apparatus for reducing energy of a base station through dynamic path control in which a traffic pattern is taken into consideration.

BACKGROUND ART

In order to satisfy a wireless data traffic demand that tends to increases after the 4G communication system commercialization, efforts to develop an improved 5G communication system or pre-5G communication system is being made. For this reason, the 5G communication system or pre-5G communication system is called a beyond 4G network communication system or a post LTE system. In order to achieve a high data transfer rate, the 5G communication system is considered to be implemented in an mmWave band (e.g., 60 GHz band). In order to reduce a loss of electric waves and increase the transfer distance of electric waves in the mmWave band, beamforming, massive MIMO, full dimensional MIMO (FD-MIMO), array antenna, analog beam-forming and large scale antenna technologies are being discussed in the 5G communication system. Furthermore, in order to improve the network of a system, technologies, such as an improved small cell, an advanced small cell, a cloud radio access network (cloud RAN), an ultra-dense network, device to device communication (D2D), wireless backhaul, a moving network, cooperative communication, coordinated multi-points (CoMP) and reception interference cancellation, are being developed in the 5G communication system. In addition, hybrid FSK and QAM modulation (FQAM) and sliding window superposition coding (SWSC) that are advanced coding modulation (ACM) schemes, improved filter bank multi-carrier (FBMC), non-orthogonal multiple access (NOMA) and sparse code multiple access (SCMA) are being developed in the 5G system.

Meanwhile, in a mobile communication system, traffic has a relatively high load time and a relatively low load time. There is a need for a scheme of efficiently operating consumption power of a base station by controlling the base station in response to a dynamically changing load.

DISCLOSURE OF INVENTION

Technical Problem

The present disclosure provides a method and apparatus for controlling the path of a base station in a wireless communication system. Furthermore, the present disclosure provides a method and apparatus for reducing energy of a base station through dynamic path control in which a traffic pattern is taken into consideration.

Solution to Problem

In accordance with an embodiment of the present disclosure, there may be provided a signal transmission method of a transmitter including at least two transmission paths, including determining the start point of a frame, determining whether physical downlink shared channel (PDSCH) allocation is present based on the start point of the frame, determining the on/off of each transmission path based on whether the PDSCH allocation is present, and transmitting a signal using the transmission path of the on state.

Furthermore, in accordance with an embodiment of the present disclosure, there may be provided a transmitter including at least two transmission paths, including a transceiver configured to transmit and receive signals and a controller configured to control to identify the start point of a frame, identify whether physical downlink shared channel (PDSCH) allocation is present based on the start point of the frame, determining an on/off of each transmission path based on whether the PDSCH allocation is present, and transmit a signal using the transmission path of the on state.

Technical objects to be achieved in the present disclosure are not limited to the aforementioned technical objects, and other technical objects not described above may be evidently understood by a person having ordinary skill in the art to which the present disclosure pertains from the following description.

Advantageous Effects of Invention

In accordance with an embodiment of the present disclosure, there can be provided a method and apparatus for controlling the path of an ENB in a wireless communication system. Furthermore, in accordance with an embodiment of the present disclosure, there can be provided a method and apparatus for reducing energy of an ENB through dynamic path control in which a traffic pattern is taken into consideration.

Furthermore, in accordance with an embodiment of the present disclosure, consumption power through transmission path on/off can be reduced by providing a single input multi output (SIMO), multi-input multi output (MIMO) switching method into which user traffic has been incorporated. Furthermore, in accordance with an embodiment of the present disclosure, energy can be reduced even in a high load time zone because dynamic control into which real-time traffic has been incorporated is possible.

MODE FOR THE INVENTION

Figure 1:
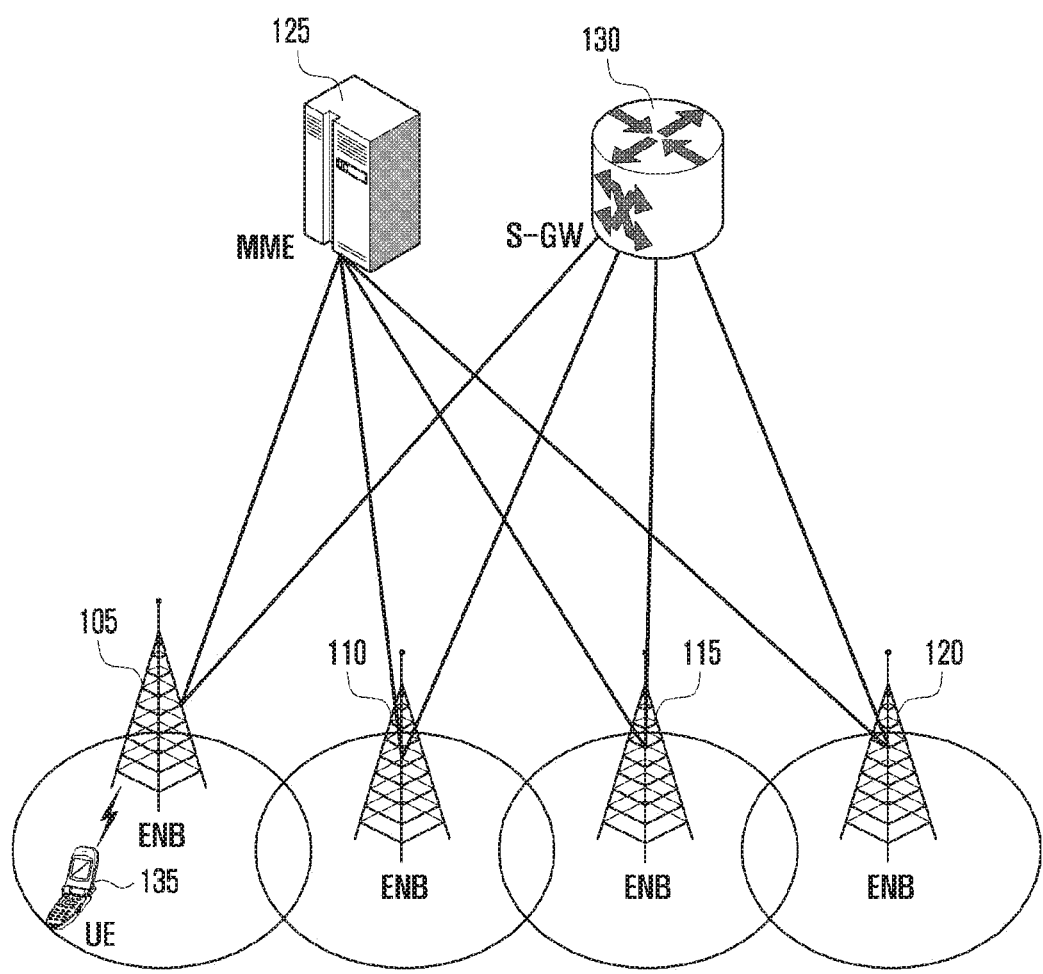
FIG. 1 is a diagram showing the configuration of an LTE system to which the present disclosure is applied.

Hereinafter, various embodiments are described in detail with reference to the accompanying drawings. It is to be noted that the same reference numerals are used throughout the drawings to refer to the same elements. Furthermore, a detailed description of the known functions or elements that may make the gist of the present disclosure vague is omitted. It is to be noted that in the following description, only parts necessary to understand operations according to various embodiments of the present disclosure are described and a description of other parts is omitted in order to prevent the gist of the present disclosure from becoming vague.

FIG. 1 is a diagram showing the configuration of an LTE system to which the present disclosure is applied.

Referring to FIG. 1, as shown, a radio access network of the LTE system includes next-generation Evolved Node Bs (hereinafter ENB, Node B or base station) 105, 110, 115 and 120, a mobility management entity (MME) 125, and a serving-gateway (S-GW) 130. A user equipment (hereinafter UE or terminal) 135 accesses an external network through the ENBs 105~120 and the S-GW 130.

In FIG. 1, the ENBs 105~120 correspond to the existing nodes B of a universal mobile telecommunication system (UMTS) system. The ENB is connected to the UE 135 through a radio channel and performs a more complicated role than the existing node B. In the LTE system, all of types of user traffic including real-time service, such as voice over IP (VoIP) through an Internet protocol, are served through a shared channel. Accordingly, a device for collecting state information, such as the buffer state, available transmission power state and channel state of UEs, and performing scheduling is required. This is responsible for the ENBs 105~120. In general, one ENB controls multiple cells. For example, in order to implement a transmission speed of 100 Mbps, an LTE system uses an orthogonal frequency division multiplexing (hereinafter OFDM) technology as a radio access technology in a 20 MHz bandwidth, for example. Furthermore, an adaptive modulation & coding (hereinafter referred to as AMC) scheme of determining a modulation scheme and channel coding rate based on a channel state of a UE is applied.

The S-GW 130 is an apparatus providing a data bearer, and generates or removes a data bearer under the control of the MME 125. The MME is an apparatus responsible for various control functions in addition to a mobility management function for a UE, and is connected to multiple ENBs.

In implement an ENB in the LTE system, an ENB separated into a digital unit (DU) (or digital signal processor) and a radio frequency unit (RU) (or radio signal processor) is recently used. The RU chiefly exchanges radio waves, and the DU chiefly exchanges data. Data processed in the DU may be transmitted through the RU. Radio waves received by the RU may be processed in the DU and used as data. The DU and the RU may be connected through an optical communication technology. The DU may be included in the controller of an ENB, and the RU may be included in the transceiver of an ENB.

An RU consumption power reduction scheme through transmission path (Tx path) on/off now used in the LTE system is a scheme of making off a path of the RU on one side while user traffic is low using traffic statistics (e.g., 5-minute statistics) of a cycle of several minutes. In general, on-the-spot traffic shows a load of 10% or less compared to an average daily max, and has a burst pattern characteristic. If a Tx path on/off control scheme having a cycle of several minutes operates, when burst and instantly-high traffic occurs, a situation in which max traffic transmission is impossible due to a resource limit attributable to path off may frequently occur. Accordingly, a Tx Path off operation must be performed based on a more conservative algorithm.

A path on/off method proposed in the specification of the present disclosure may be applied to a real-time traffic pattern because it can operate by only a resource limit during a given time (e.g., a maximum of 10 ms) and may additionally operate in a relatively low load time. In the specification of the present disclosure, whether user traffic is present or not is determined in a transmission time interval (TTI) unit (e.g., subframe unit), so the Tx on/off of a path can be controlled in real time. According to an embodiment of the present disclosure, the Tx path on/off of an RU can be controlled in real time. RU consumption power can be reduced by controlling RU Tx path on/off in real time in a subframe (may be 1 ms in LTE) section to which user traffic has not been allocated.

A Tx path may mean a path to connect an antenna port and an IQ processor 220. For example, in the case of an ENB having two antenna ports, a path to connect an antenna port 0, a multiplexing unit 0, and the output stage 0 of an IQ processor may be a path A. A path to connect an antenna port 1, a multiplexing unit 1, and the output stage 1 of the IQ processor may be said to be a path B.

Tx path on means that all paths are made on in addition to that a power amplifier (PA) is made on. Tx path off means that all paths are made off in addition to that a PA is off.

PA on/off and path on/off need to be distinguished. If a PA is dynamically controlled, the on/off of the PA is controlled depending on whether data is present or not. The PA is off in the section in which data is not present, and the PA is on in the section in which data is present. In this case, if a reference signal (RS) is present, the PA is turned on. The reason for this is that all paths are not off.

In contrast, in the case of the on/off of a path, when the path is off, if data is not present, the path is off even in a symbol to which an RS is mapped. Accordingly, a PA becomes an off state even in the symbol to which an RS has been mapped. In PA on/off, the on/off of the PA is controlled without controlling the path. In contrast, in path on/off, a signal is transmitted using a path on one side by controlling a path input to a PA.

In an embodiment of the present disclosure, to make on/off an antenna port may be used as the same meaning as that a PA corresponding to an antenna port is made on/off.

In the case of an ENB RU used in the LTE system, in general, at least two Tx antenna ports must be used for MIMO operation. Furthermore, power amplifiers within the RU need to be always on because a basic Tx control signal needs to be always transmitted for a fast response if a user wants service. However, the results of the monitoring of physical resource block (PRB) usage, that is, an actual use resource index for each LTE cell, through the field statistics of an LTE system show that a case where a physical downlink shared channel (PDSCH) in which user traffic is actually transmitted is not allocated occupies 80% or more on a daily basis in average and when the user traffic is used the least, occupies 90% or more. An embodiment of the present disclosure proposes a method of further improving RU efficiency by proposing a method of collecting a Tx control signal in one Tx path and making off the remaining Tx paths by taking into consideration a user traffic use pattern if user traffic is not present (if a PDSCH is not present, if a PDSCH has not been allocated or if a data channel is not allocated).

Figure 2:
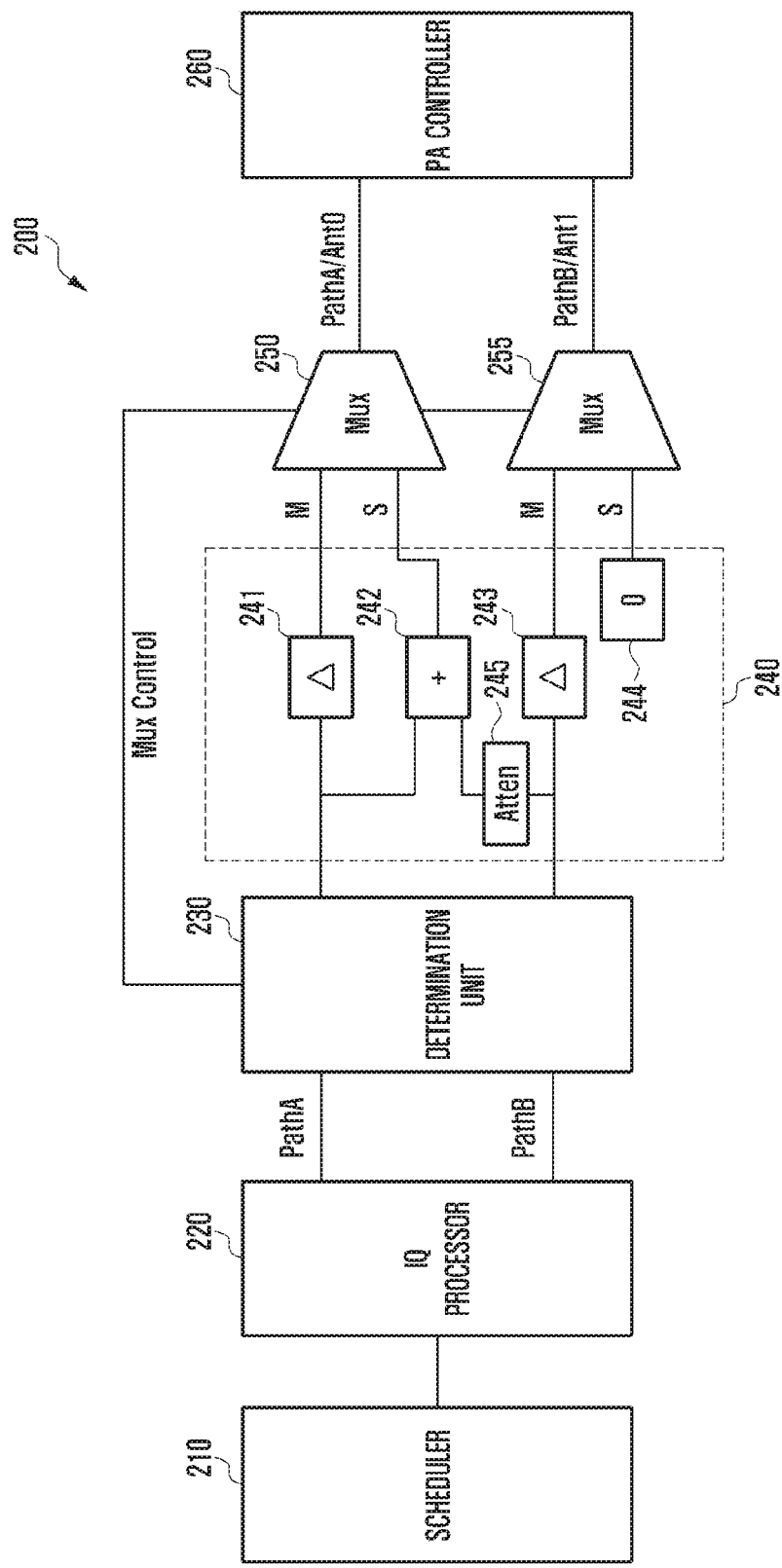
FIG. 2 is a diagram illustrating an ENB including two transmission paths according to an embodiment of the present disclosure.

FIG. 2 is a diagram illustrating an ENB including two transmission paths according to an embodiment of the present disclosure. The configuration of FIG. 2 may be an entity forming a small cell of an ENB. The ENB of FIG. 2 may transmit two CRSs through two Tx antenna ports.

Referring to FIG. 2, the ENB 200 may include a scheduler 210, an IQ processor 220, a determination unit 230 and a PA controller 260. The ENB 200 may include multiplexing units 250 and 255 and an additional input unit 240. The multiplexing unit 250, 255 may include a multiplexer or Mux. The additional input unit may include input entities, such as 241, 242, 243, 244 and 245.

The scheduler 210 schedules LTE resources. In the LTE system, user traffic is served through a shared channel. Accordingly, there is a need for an apparatus for collecting and scheduling state information, such as the buffer state, available transmission power state and channel state of UEs or users. This may be performed in the scheduler 210 of the ENB.

The IQ processor 220 may generate a signal to be transmitted. The IQ processor 220 may generate an LTE baseband signal. The IQ processor 220 may generate IQ data. The IQ data is data having amplitude and a phase.

The determination unit 230 may identify whether a PDSCH is transmitted. The determination unit 230 may identify whether a PDSCH is transmitted for each Tx path. The determination unit 230 may identify whether user traffic transmission is present in a PDSCH for each Tx path. The determination unit 230 may control the multiplexing units 250 and 255 based on whether a PDSCH in each path is transmitted. The determination unit 230 may control the multiplexing units 250 and 255 to select "M" or "S". The multiplexing unit 250, 255 may select the input of the multiplexing unit 250, 255 corresponding to control under the control of the determination unit 230. The multiplexing unit may select an input corresponding to M when it selects "M", and may select an input corresponding to S when it selects "S."

Furthermore, the determination unit 230 may determine the start point of a frame or identify the start point of a subframe, and may determine the start point of each symbol within a subframe. In the case of LTE, a frame is a radio frame, and the radio frame may include 10 subframes. One subframe may have a time interval of 1 ms. One subframe may include 14 symbols or 12 symbols.

In an embodiment of the present disclosure, a path is made off in a symbol not having user traffic. In the case of a mobile communication system, not user traffic, but common information may be transmitted periodically or aperiodically. For example, a physical broadcast control channel, a synchronization channel, etc. may be transmitted. Data needs to be distinguished from traffic in a PDSCH region and data not user traffic may be classified by distinguishing between the start point of a radio frame and the start point of a subframe.

Furthermore, in an embodiment of the present disclosure, the start point of a subframe or the start point of each symbol within a subframe may be used to determine whether to transmit a PDSCH or whether user traffic is present. In an LTE subframe, a PDSCH may be transmitted through 1~3 symbols. After the symbol of each subframe is identified, whether user traffic is present in a given symbol (e.g., the fourth symbol) of each subframe may be determined. If user traffic is not identified in a corresponding symbol, it may be determined that user traffic is not present in a corresponding subframe. Meanwhile, a symbol to identify whether user traffic is present may be determined based on a physical control format indicator channel (PCFICH). For example, if the PCFICH of a symbol is 1, user traffic may be checked in the second symbol of a corresponding subframe. If the PCFICH is 2, user traffic may be checked in the third symbol of the corresponding subframe. If the PCFICH is 3, user traffic may be checked in the fourth symbol of the corresponding subframe. The example is one embodiment, and the location of a symbol to identify whether traffic is present in the present disclosure is not limited to the examples. Whether user traffic is present may be checked in symbols following a given symbol in addition to the given symbol, and whether user traffic may be checked at given symbol intervals.

An adder 242 performs a function of adding digital data. Δ blocks 241 and 243 are block to input delay. The Δ block inputs (generates) the same delay as one adder of another path. The 2Δ blocks input (generate) the same delay as the two addresses of different paths. A 0 block 244 inputs (delivers) a "0" value to the multiplexing unit 255. An Atten block 245 performs a function of attenuating (0~10 dB) IQ data.

The multiplexing unit 250, 255 may select data (digital data) to be transmitted to the PA controller 260 based on information received from the determination unit 230 or the additional input unit 240. The multiplexing unit 250, 255 may select data corresponding to M as an input when the determination unit 230 indicates that "M" should be selected, and may select data corresponding to S as an input when "S" is selected.

The PA controller 260 may generate a signal for making on/off a path based on a signal received from the multiplexing unit 250, 255, and may control a PA corresponding to each path. The PA controller 260 may make off the PA of a corresponding path when the digital value of the corresponding path is "0." If the digital value of a corresponding path is not 0, the PA controller 260 may control to make on a PA. A PA may be connected to the output unit of the PA controller, and the PA may be connected to a corresponding antenna port.

The ENB of FIG. 2 according to an embodiment may include a DU and an RU. The DU may include the scheduler 210. The RU may include the IQ processor 220, the determination unit 230, the additional input unit 240, the multiplexing units 250 and 255, and the PA controller 260. Furthermore, the DU may include the scheduler 210 and the IQ processor. The RU may be configured to include the determination unit 230, the additional input unit 240, the multiplexing units 250 and 255, and the PA controller 260.

If an ENB includes a controller and a transceiver, the controller may be configured to include all the IQ processor 220, determination unit 230, additional input unit 240, multiplexing units 250 and 255, and PA controller 260 in addition to the scheduler 210. The transceiver may be configured to include an antenna and a PA. Alternatively, according to another embodiment, the configuration of the controller is not limited thereto, and the controller may be configured to include only some of the elements of the scheduler 210, IQ processor 220, determination unit 230, additional input unit 240, multiplexing units 250 and 255, and PA controller 260, and the transceiver may be configured to include the remaining elements.

Figure 3:
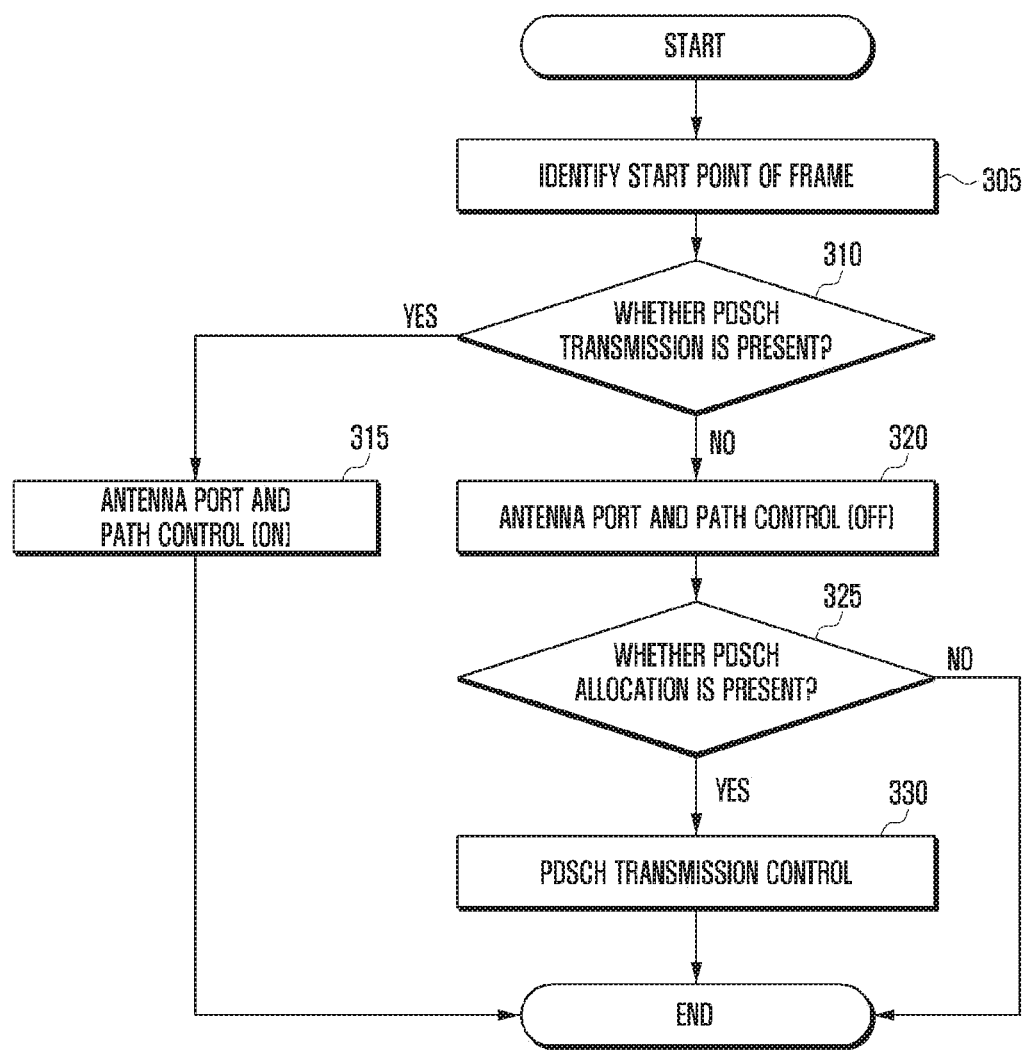
FIG. 3 is a diagram illustrating an ENB operation according to an embodiment of the present disclosure.

FIG. 3 is a diagram illustrating an ENB operation according to an embodiment of the present disclosure.

FIG. 3 relates to an operation of an ENB using two antenna ports as in the embodiment of FIG. 2. In this case, the configuration of FIG. 3 is not limited to an operation of an ENB using two antenna ports and may be applied to an operation of an ENB using a plurality of two or more antenna ports. If two antenna ports are used, an ENB may transmit a cell-specific reference signal (CRS) or a common reference signal (CRS) using the two antenna ports. In the embodiment of FIG. 3, the controller of the ENB may include a scheduler, a modem, a determination unit, a PA controller, and so on.

At operation 305, the controller of the ENB may identify the start point of a radio frame and the start point of a subframe. The identification operation may be performed in the scheduler, modem or determination unit of the ENB. For example, in the case of an LTE system, the start point of a radio frame of 10 ms may be discovered. Furthermore, if the start point of a subframe is to be identified, a subframe number may be identified in a corresponding radio frame. Meanwhile, the controller may identify only the start point of a subframe by omitting an operation of identifying the start point of a radio frame.

At operation 310, the controller of the ENB identifies whether a PDSCH is transmitted in a corresponding subframe. The controller of the ENB may determine whether user traffic through a PDSCH has been allocated or mapped in a corresponding subframe. The controller of the ENB may identify whether a PDSCH is transmitted by detecting IQ data transmitted from an RU to a DU. If IQ data is 0 in a given symbol, the controller may determine that PDSCH transmission is not present. If IQ data is not 0 in a given symbol, the controller may determine that PDSCH transmission is present.

The controller of the ENB may determine whether PDSCH transmission is present for each path corresponding to each antenna port. If a PDSCH is transmitted in at least one path, the controller may control the ENB to operate in a MIMO mode. In contrast, if a PDSCH is not transmitted in any path, the controller may control the ENB to operate in a SIMO mode.

The controller of the ENB may identify whether a PDSCH for each path is transmitted in a given symbol of a subframe. For example, the given symbol may be the fourth symbol of each subframe. In LTE, in an LTE channel bandwidth except a channel bandwidth 1.4 MHz, transmission up to the third symbol is possible in a PDCCH region. Accordingly, if a PDSCH is transmitted, a PDSCH is always transmitted from the fourth symbol. Accordingly, if the fourth symbol is configured as a symbol for identifying user traffic, whether user traffic through a PDSCH is transmitted may be identified with respect to all PDCCHs.

Furthermore, whether a PDSCH is transmitted may be identified in symbols subsequent to the fourth symbol of a corresponding subframe. Whether a PDSCH is transmitted may be identified from the second symbol or the third symbol depending on a PCFICH.

The ENB controller controls the ENB to operate in MIMO if a PDSCH is transmitted even in any one path (315). For example, the determination unit may select "M" in the multiplexing unit and transmit a control signal for an operation in MIMO to the multiplexing unit. Since the output value of the multiplexing unit is not 0, the PA controller may perform control so that all the antenna ports (antenna port 0/1) and all the paths (path A and path B) are not off.

The ENB controller controls the ENB to operate in SIMO if a PDSCH is not transmitted in any one path (320). For example, the determination unit may select "S" in the multiplexing unit and transmit a control signal for an operation in SIMO to the multiplexing unit. If "S" is selected in the multiplexing unit, the output value of the multiplexing unit for the path A is not 0. Accordingly, the PA controller controls the path A and the antenna port 0 to operate on. In contrast, since the output value of the multiplexing unit for the path B is not 0, the PA controller controls the path B and a corresponding antenna port 1 to operate off. The PA controller may control a given antenna port and path to become on and control the other antenna port and path to become off. The antenna port 0 and a corresponding path A may be configured to be on and the antenna port 1 and a corresponding path B may be configured to be off depending on whether a PDSCH is present in the same manner as that described above.

The ENB may determine and control path on/off depending on whether PDSCH transmission is present in the same manner as that described above.

Additionally, a PDSCH may occur while the ENB operates in SIMO. At operation 325, the controller of the ENB may identify whether PDSCH allocation is present during an operation in SIMO. If PDSCH allocation is not present, the ENB operates in SIMO in a corresponding subframe and the off state of a path is maintained.

If PDSCH allocation is present, at operation 330, the controller of the ENB allocates and transmits a PDSCH through an antenna port (antenna port 0) and path (path A) of the on state during a given subframe interval (N subframe), and does not allocate or transmit a PDSCH with respect to an antenna port (antenna port 1) and path (path B) of the off state. The range of N may be 1~10. Although a PDSCH has not been allocated, the antenna port (antenna port 1) and path (path B) of the off state may switch to the on state. In this case, a signal other than the PDSCH may be transmitted in the antenna port (antenna port 1) and path (path B) of the off state in the SIMO state prior to the PDSCH allocation. For example, the antenna port (antenna port 1) and path (path B) of the off state become an on state, and may transmit a reference signal.

To not transmit a PDSCH through a specific antenna port (antenna port 1) and path (path B) during a given N subframe time as described above is for minimizing a channel estimation error of a MIMO-related CRS in a UE when a SIMO operation switches to a MIMO operation. The reference signal is transmitted during the N subframe and a PDSCH is then transmitted. Accordingly, the ENB may estimate a channel through the reception of a MIMO-related CRS, and may receive a PDSCH, thereby being capable of reducing a PDSCH reception error.

The controller of the ENB maintains the SIMO operation if a PDSCH is not continuously allocated during the N subframe. In this case, the antenna port (antenna port 0) and path (path A) operating in SIMO operate on, and the antenna port (antenna port 1) and path (path B) that became off prior to operation 325 become off.

The controller of the ENB continuously allocates a PDSCH during the N subframe, and changes the SIMO operation to the MIMO operation if a PDSCH has been allocated to the N+1 subframe. The ENB controller may make on all antenna ports and make on a path for all the antenna ports. To make on/off an antenna port may include making on/off a PA corresponding to the antenna port. The on/off of an antenna port and path depending on whether a PDSCH is transmitted or allocated may be changed depending on a configuration.

Figure 4:
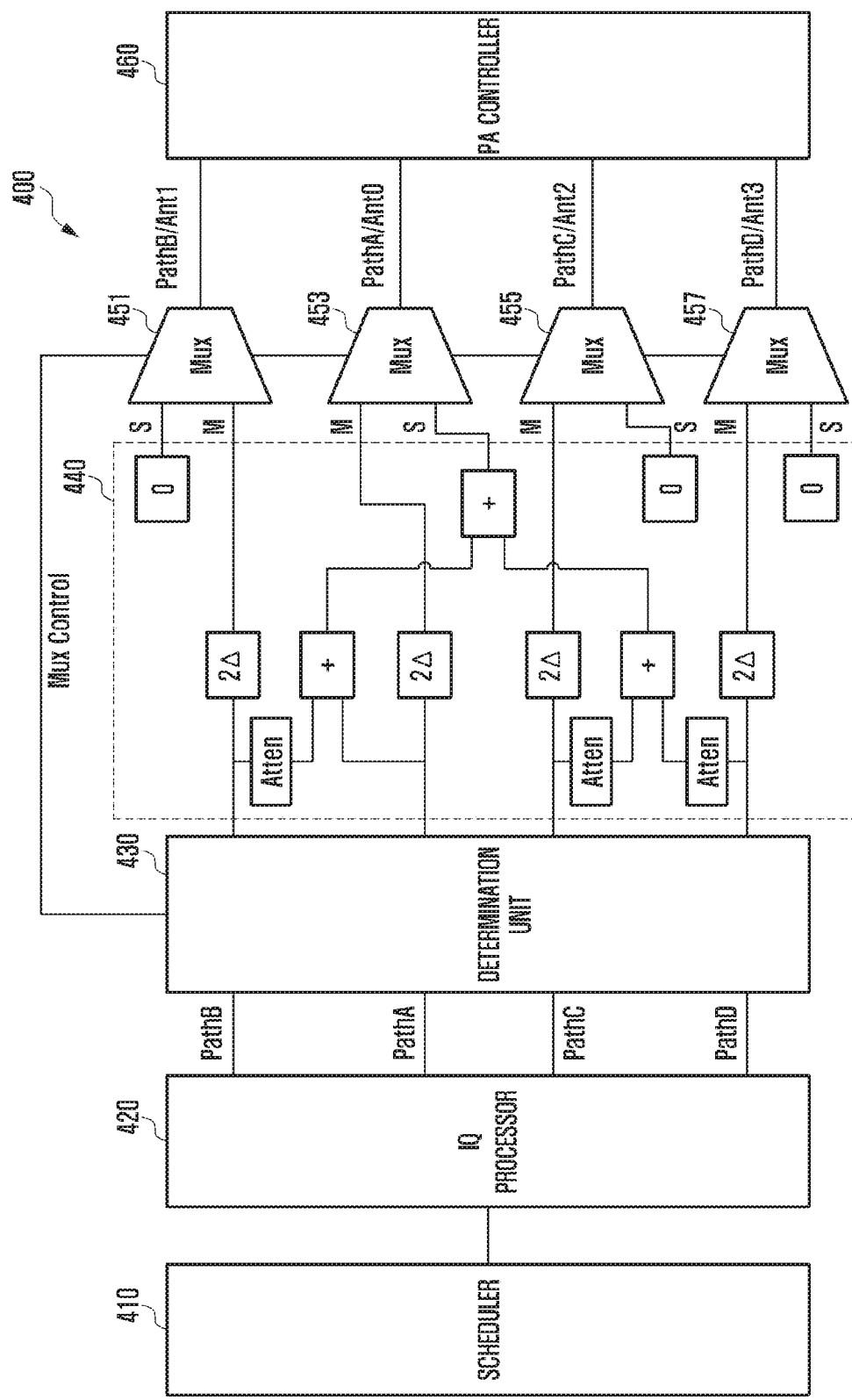
FIG. 4 is a diagram illustrating an eNB including four transmission paths according to an embodiment of the present disclosure. The configuration of FIG. 4 may be an entity forming a small cell of an ENB.

FIG. 4 is a diagram illustrating an eNB including four transmission paths according to an embodiment of the present disclosure. The configuration of FIG. 4 may be an entity forming a small cell of an ENB. The ENB of FIG. 4 may transmit four CRSs through four Tx antenna ports.

Referring to FIG. 4, the ENB 400 may include a scheduler 410, an IQ processor 420, a determination unit 430, and a PA controller 460. The ENB 400 may include multiplexing units 451, 453, 455 and 457 and an additional input unit 440. The multiplexing unit 450, 455 may include a multiplexer (or Mux).

Each entity of FIG. 4 may perform the same function as each element of FIG. 2. FIG. 2 is an ENB configuration for two antenna ports, whereas FIG. 4 is an ENB configuration for four antenna port. Accordingly, in FIG. 4, the ENB includes four paths (path A, path B, path C and path D) and four multiplexing units. The PA controller may be connected to PAs corresponding to four antenna ports.

The scheduler 410 schedules LTE resources.

The IQ processor 420 may generate a signal to be transmitted. The IQ processor 420 may generate an LTE baseband signal.

The determination unit 430 may identify whether a PDSCH is transmitted. The determination unit 230 may identify whether a PDSCH is transmitted for each Tx path. The determination unit 430 may identify whether user traffic transmission is present in a PDSCH for each Tx path. The determination unit 230 may control the multiplexing units 451, 453, 455 and 457 based on whether a PDSCH in each path is transmitted. The determination unit 430 may control the multiplexing units 451, 453, 455 and 457 to select "M" or "S." The multiplexing unit 451, 453, 455, 457 may select the input of the multiplexing unit corresponding to control under the control of the determination unit 230. The multiplexing unit may select an input corresponding to M when it selects "M", and may select an input corresponding to S when it selects "S."

Furthermore, the determination unit 230 may determine the start point of a frame, may identify the start point of a subframe, and may determine the start point of each symbol within a subframe.

For the configuration of the additional input unit 440, reference is made to FIG. 2.

The multiplexing unit 451, 453, 455, 457 may select data (digital data) to be transmitted to the PA controller 260 based on information received from the determination unit 430 or the additional input unit 440. The multiplexing unit may select data corresponding to M as an input when the determination unit 430 indicates that "M" should be selected, and may select data corresponding to S as an input when "M" is selected.

The PA controller 460 may generate a signal for making on/off a path based on a signal received from the multiplexing unit 451, 453, 455, 457, and may control a PA corresponding to each path. The PA controller 460 may make off the PA of a corresponding path if the digital value of the corresponding path is "0." The PA controller 460 may control a PA to become on if the digital value of a corresponding path is not 0. The PA may be connected to the output unit of the PA controller, and the PA may be connected to a corresponding antenna port.

For an operation of an ENB using four Tx antenna ports, reference may be made to the ENB operation described in FIG. 3.

The controller of the ENB may identify the start point of a radio frame, the start point of a subframe. The identification operation may be performed in the scheduler, modem or determination unit of the ENB. For example, in the case of an LTE system, the start point of a radio frame of 10 ms may be discovered. Furthermore, if the start point of a subframe is to be identified, the start point of the subframe may be identified based on a subframe number in a corresponding radio frame. Meanwhile, the controller may identify only the start point of a subframe by omitting an operation of identifying the start point of a radio frame.

Next, the controller of the ENB identifies whether a PDSCH is transmitted in the corresponding subframe. The controller of the ENB may determine whether user traffic through a PDSCH has been allocated, mapped in the corresponding subframe. The controller of the ENB may identify whether PDSCH transmission is present in each path corresponding to each antenna port. If a PDSCH is transmitted in at least one path, the controller may control the ENB to operate in the MIMO mode. In contrast, if a PDSCH is not transmitted in any path, the controller may control the ENB to operate in the SIMO mode.

The ENB controller controls the ENB to operate in MIMO if a PDSCH is transmitted in any one path (315). For example, the determination unit may select "M" in the multiplexing unit and transmit a control signal for an operation in MIMO to the multiplexing unit. Since the output value of the multiplexing unit is not 0, the PA controller may control all the antenna ports (antenna ports 0/1/2/3) and all the paths (path A, path B, path C and path D) to not become off.

The ENB controller controls the ENB to operate in SIMO if a PDSCH is not transmitted in any one path (320). For example, the determination unit may select "S" in the multiplexing unit and transmit a control signal for an operation in SIMO to the multiplexing unit. If "S" is selected in the multiplexing unit, the output value of a multiplexing unit for the path A is not 0. Accordingly, the PA controller controls the path A and antenna port 0 to operate on. In contrast, since the output values of multiplexing units for the paths B, C and D are 0, the PA controller controls the paths B, C and D and corresponding antenna ports 1, 2 and 3 to operate off. The PA controller may control a given antenna port and path to become on and other antenna ports and paths to become off in the same manner as that described above. In the embodiment, when the ENB operates in SIMO, the antenna port 0 and the corresponding path A may be configured to become on, and the antenna ports 1, 2 and 3 and the corresponding paths B, C and D may be configured to become off.

The ENB may determine and control path on/off depending on whether PDSCH transmission is present in the same manner as that described above.

Additionally, a PDSCH may occur while the ENB operates in SIMO. The controller of the ENB may identify whether PDSCH allocation is present while the ENB operates in SIMO. If PDSCH allocation is not present, the ENB operates in SIMO in a corresponding subframe and maintains the off state of a path.

If PDSCH allocation is present, the controller of the ENB allocates and transmits a PDSCH through the antenna port (antenna port 0) and path (path A) of the on state during a given subframe interval (N subframe), and does not allocate or transmit a PDSCH with respect to the antenna ports (antenna ports 1, 2 and 3) and paths (paths B, C and D) of the off state. The range of N may be 1~10. Although a PDSCH has not been allocated, the antenna ports (antenna ports 1, 2 and 3) and paths (paths B, C and D) of the off state may be made on. In this case, a signal other than the PDSCH may be transmitted in the antenna ports (antenna ports 1, 2 and 3) and paths (paths B, C and D) of the off state in the SIMO state prior to the PDSCH allocation. For example, the antenna port (antenna port 1) and path (path B) of the off state may become the on state, and may transmit a reference signal (e.g., CRS).

To not transmit a PDSCH through specific antenna ports (antenna ports 1, 2 and 3) and paths (paths B, C and D) during a given N subframe as described above is for minimizing a channel estimation error of a MIMO-related CRS in a UE when the SIMO operation switches to the MIMO operation. The reference signal is transmitted during the N subframe and a PDSCH is then transmitted. Accordingly, the ENB may estimate a channel through the reception of a MIMO-related CRS, and may receive a PDSCH, thereby being capable of reducing a PDSCH reception error.

The controller of the ENB maintains the SIMO operation if a PDSCH is not continuously allocated during the N subframe. In this case, the antenna port (antenna port 0) and path (path A) operating in SIMO operate on, and the antenna ports (antenna ports 1, 2 and 3) and paths (paths B, C and D) that became off previous become off.

The controller of the ENB continuously allocates a PDSCH during the N subframe, and changes the SIMO operation to the MIMO operation if a PDSCH has been allocated in an N+1 subframe. The ENB controller may make on all the antenna ports and make on paths for all the antenna ports. To make on/off an antenna port may include making on/off a PA corresponding to the antenna port. The on/off of the antenna port and path depending on whether PDSCH transmission or allocation is present may be changed depending on a configuration.

Figure 5:
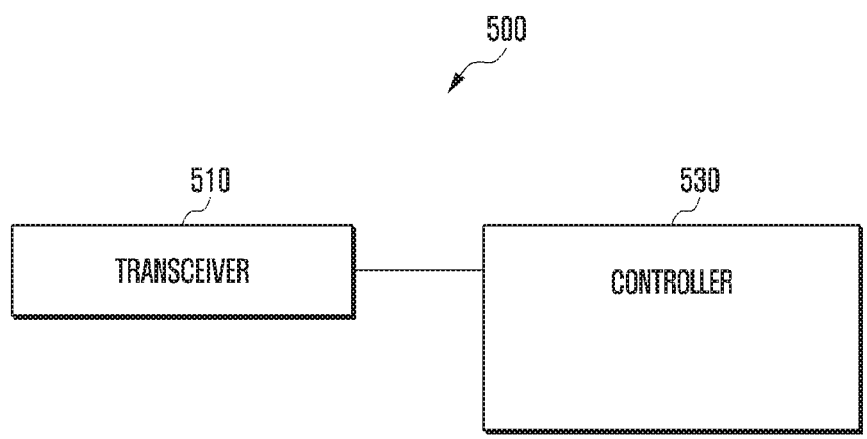
FIG. 5 is a diagram illustrating an ENB according to an embodiment of the present disclosure.

FIG. 5 is a diagram illustrating an ENB according to an embodiment of the present disclosure. The apparatus of FIG. 5 may be a transmitter or may be part of the configuration of an ENB. For example, the apparatus of FIG. 5 may be the DU of the configuration of an ENB. Furthermore, the configuration of FIG. 5 may be an entity forming a small cell.

The ENB 500 may include a transceiver 510 configured to perform communication with at least one network node and a controller 530 configured to control an overall operation of the ENB. The ENB 500 may include a DU and an RU. In accordance with an embodiment of the present disclosure, the controller 530 may perform an ENB operation for performing each of the embodiments of the present disclosure described through FIGS. 1 to 4. The ENB 500 may include the configuration of the ENB described in FIG. 2 or the configuration of the ENB described in FIG. 4. The transceiver 510 may be named a communication unit, and the controller 530 may be named a processor.

In accordance with an embodiment of the present disclosure, the controller 530 may determine the start point of a frame, may determine whether physical downlink shared channel (PDSCH) allocation is present based on the start point of the frame, may determine the on/off of each transmission path based on whether PDSCH allocation is present, and may control a signal to be transmitted using the transmission path of the on state.

Furthermore, if a PDSCH is not allocated, the controller 530 may control to make on a given one transmission path and to make off the remaining transmission paths. In the step of determining the start point of the frame, the start point of a radio frame may be identified and the start point of a subframe may be identified based on a subframe number in the identified radio frame or the start point of the subframe may be identified regardless of the start point of the radio frame. Whether PDSCH allocation is present may be determined based on IQ data information.

Furthermore, the controller 530 may control to determine whether PDSCH allocation is present based on whether IQ data information is present in a given symbol of a subframe. The given symbol may be the fourth symbol of the subframe, but is not limited thereto.

Furthermore, the controller 530 may detect PDSCH allocation while the transmitter operates in the SIMO mode, may change a path of an off state to an on state when PDSCH allocation is detected in the SIMO mode, and may control to not transmit a PDSCH and to transmit a reference signal during a given time with respect to a path changed from the off state to the on state.

Furthermore, the controller 530 may include a determination unit configured to identify whether PDSCH allocation is present, a multiplexing unit configured to select an input based on the identification of the determination unit, and a PA controller configured to control a power amplifier (PA) and the on/off of a transmission path based on the output of the multiplexing unit. The configuration of the controller 530 is not limited thereto and may be configured in various structures described in FIG. 2.

The controller 530 may be an element included in the digital frequency unit (DU) of the ENB.

The configuration and function of the controller 530 is not limited to the description of FIG. 5, and includes the operations, configurations and functions of the ENBs of FIGS. 1 to 4 described in the present disclosure.

Furthermore, the embodiments disclosed in the specification and drawings have proposed only specific examples in order to easily describe the contents of the present disclosure and help understanding of the present disclosure, and are not intended to restrict the scope of the present disclosure. Accordingly, the scope of the present disclosure should be construed as including all of changes or modified forms derived based on the technical spirit of the present disclosure in addition to the disclosed embodiments.

The invention claimed is:

1. A signal transmission method of a transmitter comprising at least two transmission paths, the method comprising:
    identifying a start point of a frame;
    identifying whether data is currently allocated to the at least two transmission paths, respectively, based on the start point of the frame in every transmission time interval (TTI);
    determining an on state for each transmission path in case that the data is currently allocated to at least one of the at least two transmission paths; and
    transmitting a signal based on the determined on state for each transmission path.

2. The method of claim 1, wherein a pre-configured one transmission path is made an on state and remaining transmission paths are made an off state in case that the data is currently not allocated to the at least two transmission paths.

3. The method of claim 1, wherein a determination of whether the data is currently allocated to the at least two transmission paths is determined based on IQ data information.

4. The method of claim 1, wherein a determination of whether the data is currently allocated to the at least two transmission paths is determined based on whether IQ data information is present in a pre-configured symbol of a subframe.

5. The method of claim 4, wherein the pre-configured symbol is a fourth symbol of the subframe.

6. The method of claim 1, further comprising:
    detecting, by the transmitter, the data allocation during an operation in an SIMO mode;
    switching from the path of the off state to the on state in case that the data allocation is detected in the SIMO mode; and
    transmitting a reference signal without transmitting a data during a pre-configured time for the path switched from the off state to the on state.

7. A transmitter comprising at least two transmission paths, the transmitter comprising:
    a transceiver configured to transmit and receive signals; and
    a controller configured to:
        identify a start point of a frame, identify whether data is currently allocated to the at least two transmission paths, respectively, based on the start point of the frame in every transmission time interval (TTI), determine an on state for each transmission path in case that the data is currently allocated to at least one of the at least two transmission paths, and transmit a signal based on the determined on state for each transmission path.

8. The transmitter of claim 7, wherein the controller is further configured to make an on state a pre-configured one transmission path and an off state remaining transmission paths in case that the data is currently not allocated to the at least two transmission paths.

9. The transmitter of claim 7, wherein a determination of whether the data is currently allocated to the at least two transmission paths is determined based on IQ data information.

10. The transmitter of claim 7, wherein the controller is further configured to determine whether the data is currently allocated to the at least two transmission paths based on whether IQ data information is present in a pre-configured symbol of a subframe.

11. The transmitter of claim 10, wherein the pre-configured symbol is a fourth symbol of the subframe.

12. The transmitter of claim 7, wherein the controller is further configured to:

control the transmitter to detect the data allocation during an operation in an SIMO mode;

switch from the path of the off state to the on state in case that the data allocation is detected in the SIMO mode; and transmit a reference signal without transmitting a data during a pre-configured time for the path switched from the off state to the on state.

13. The transmitter of claim 7, wherein the controller is further configured to comprise:

a scheduler configured to collect state information of UEs or users and schedule LTE resources;

an IQ processor configured to generate IQ data having amplitude and a phase a determination unit configured to identify whether the data is currently allocated to the at least two transmission paths;

a multiplexing unit configured to select an input based on an identification of the determination unit; and a power amplifier (PA) controller configured to control a PA and the connection state for the transmission path based on an output of the multiplexing unit.

* * * * *